United States Patent
Engelberg et al.

(10) Patent No.: US 12,284,200 B2
(45) Date of Patent: Apr. 22, 2025

(54) AUTOMATED PRIORITIZATION OF PROCESS-AWARE CYBER RISK MITIGATION

(71) Applicant: Accenture Global Solutions Limited, Dublin (IE)

(72) Inventors: Gal Engelberg, Pardes-hana (IL); Dan Klein, Rosh Ha'ayin (IL); Tomer Ram, Netanya (IL)

(73) Assignee: Accenture Global Solutions Limited, Dublin (IE)

( * ) Notice: Subject to any disclaimer, the term of this patent is extended or adjusted under 35 U.S.C. 154(b) by 424 days.

(21) Appl. No.: 17/675,330

(22) Filed: Feb. 18, 2022

(65) Prior Publication Data
US 2022/0263855 A1   Aug. 18, 2022

Related U.S. Application Data

(60) Provisional application No. 63/150,664, filed on Feb. 18, 2021.

(51) Int. Cl.
*H04L 9/40* (2022.01)
*G06N 5/04* (2023.01)

(52) U.S. Cl.
CPC .......... *H04L 63/1433* (2013.01); *G06N 5/04* (2013.01); *H04L 63/1441* (2013.01)

(58) Field of Classification Search
CPC .................. H04L 63/1433; H04L 63/1441
(Continued)

(56) References Cited

U.S. PATENT DOCUMENTS

| | | |
|---|---|---|
| 5,521,910 A | 5/1996 | Matthews |
| 6,279,113 B1 | 8/2001 | Vaidya |

(Continued)

FOREIGN PATENT DOCUMENTS

| | | |
|---|---|---|
| EP | 1559008 | 8/2005 |
| EP | 1768043 | 3/2007 |

(Continued)

OTHER PUBLICATIONS

Brazhuk, "Towards automation of threat modeling based on a semantic model of attack patterns and weaknesses," arXiv, Dec. 8, 2021, arXiv:2112.04231v1, 14 pages.
(Continued)

*Primary Examiner* — Teshome Hailu
(74) *Attorney, Agent, or Firm* — Polsinelli PC

(57) ABSTRACT

Implementations are directed to receiving graph data representative of a process-aware AAG that is representative of potential lateral movement of adversaries within a computer network, receiving risk profile data representative of a risk profile of an enterprise with respect to two or more risk aspects, generating, by a process-aware risk assessment module, a risk assessment based on the process-aware AAG and the risk profile, and generating, by a mitigation simulator module, a mitigation list based on the process-aware AAG, the risk profile, and the risk assessment, the mitigation list comprising a prioritized list of two or more facts of the process-aware AAG. Other implementations of this aspect include corresponding systems, apparatus, and computer programs, configured to perform the actions of the methods, encoded on computer storage devices.

18 Claims, 8 Drawing Sheets

(58) Field of Classification Search
USPC .................................................. 726/23
See application file for complete search history.

(56) References Cited

U.S. PATENT DOCUMENTS

| | | | |
|---|---|---|---|
| 6,487,666 | B1 | 11/2002 | Shanklin et al. |
| 7,540,025 | B2 | 5/2009 | Tzadikario |
| 7,703,138 | B2 | 4/2010 | Desai et al. |
| 7,904,962 | B1 | 3/2011 | Jajodia et al. |
| 8,099,760 | B2 | 1/2012 | Cohen et al. |
| 8,176,561 | B1 | 5/2012 | Hurst et al. |
| 8,656,493 | B2 | 2/2014 | Capalik |
| 8,881,288 | B1 | 11/2014 | Levy et al. |
| 9,256,739 | B1 | 2/2016 | Roundy et al. |
| 9,563,771 | B2 | 2/2017 | Lang et al. |
| 9,633,306 | B2 | 4/2017 | Liu et al. |
| 10,084,804 | B2 | 9/2018 | Kapadia et al. |
| 10,291,645 | B1 | 5/2019 | Frantzen et al. |
| 10,382,473 | B1 | 8/2019 | Ashkenazy et al. |
| 10,447,721 | B2 | 10/2019 | Lasser |
| 10,447,727 | B1 | 10/2019 | Hecht |
| 10,601,854 | B2 | 3/2020 | Lokamathe et al. |
| 10,642,840 | B1 | 5/2020 | Attaluri et al. |
| 10,659,488 | B1 | 5/2020 | Rajasooriya et al. |
| 10,771,492 | B2 | 9/2020 | Hudis et al. |
| 10,848,515 | B1 | 11/2020 | Pokhrel et al. |
| 10,868,825 | B1 | 12/2020 | Dominessy et al. |
| 10,873,533 | B1 | 12/2020 | Ismailsheriff et al. |
| 10,956,566 | B2 | 3/2021 | Shu et al. |
| 10,958,667 | B1 | 3/2021 | Maida et al. |
| 11,089,040 | B2 | 8/2021 | Jang et al. |
| 11,128,654 | B1 | 9/2021 | Joyce et al. |
| 11,159,555 | B2 | 10/2021 | Hadar et al. |
| 11,184,385 | B2 | 11/2021 | Hadar et al. |
| 11,201,890 | B1 * | 12/2021 | Coull ................ G06F 16/9024 |
| 11,232,235 | B2 | 1/2022 | Hadar et al. |
| 11,277,431 | B2 | 3/2022 | Hassanzadeh et al. |
| 11,281,806 | B2 | 3/2022 | Hadar et al. |
| 11,283,824 | B1 | 3/2022 | Berger et al. |
| 11,283,825 | B2 | 3/2022 | Grabois et al. |
| 11,411,976 | B2 | 8/2022 | Basovskiy et al. |
| 11,483,213 | B2 | 10/2022 | Engelberg et al. |
| 11,533,332 | B2 | 12/2022 | Engelberg et al. |
| 2005/0138413 | A1 | 6/2005 | Lippmann et al. |
| 2005/0193430 | A1 * | 9/2005 | Cohen ................ H04L 63/1433 726/25 |
| 2006/0037077 | A1 | 2/2006 | Gadde et al. |
| 2007/0067845 | A1 * | 3/2007 | Wiemer ............. H04L 63/1433 726/25 |
| 2008/0044018 | A1 | 2/2008 | Scrimsher et al. |
| 2008/0289039 | A1 | 11/2008 | Rits et al. |
| 2008/0301765 | A1 | 12/2008 | Nicol et al. |
| 2009/0077666 | A1 | 3/2009 | Chen et al. |
| 2009/0125973 | A1 * | 5/2009 | Byers ................ H04L 63/1433 726/1 |
| 2009/0138590 | A1 | 5/2009 | Lee et al. |
| 2009/0260086 | A1 * | 10/2009 | Lang ..................... G06F 21/577 726/25 |
| 2009/0307772 | A1 | 12/2009 | Markham et al. |
| 2009/0319248 | A1 | 12/2009 | White et al. |
| 2010/0058456 | A1 | 3/2010 | Jajodia et al. |
| 2010/0100546 | A1 | 4/2010 | Kohler |
| 2010/0138925 | A1 | 7/2010 | Barai et al. |
| 2010/0174670 | A1 | 7/2010 | Malik et al. |
| 2011/0035803 | A1 | 2/2011 | Lucangeli Obes et al. |
| 2011/0061104 | A1 | 3/2011 | Sarraute Yamada et al. |
| 2011/0093916 | A1 | 4/2011 | Lang et al. |
| 2011/0093956 | A1 | 4/2011 | Laarakkers et al. |
| 2013/0097125 | A1 | 4/2013 | Marvasti et al. |
| 2013/0219503 | A1 | 8/2013 | Amnon et al. |
| 2014/0082738 | A1 | 3/2014 | Bahl |
| 2014/0173740 | A1 | 6/2014 | Albanese et al. |
| 2015/0047026 | A1 | 2/2015 | Neil et al. |
| 2015/0106867 | A1 | 4/2015 | Liang |
| 2015/0199207 | A1 | 7/2015 | Lin et al. |
| 2015/0261958 | A1 | 9/2015 | Hale et al. |
| 2015/0326601 | A1 | 11/2015 | Grondin et al. |
| 2015/0350018 | A1 | 12/2015 | Hui et al. |
| 2016/0105454 | A1 | 4/2016 | Li et al. |
| 2016/0205122 | A1 | 7/2016 | Bassett |
| 2016/0277423 | A1 | 9/2016 | Apostolescu et al. |
| 2016/0292599 | A1 | 10/2016 | Andrews et al. |
| 2016/0301704 | A1 | 10/2016 | Hassanzadeh et al. |
| 2016/0301709 | A1 | 10/2016 | Hassanzadeh et al. |
| 2017/0012836 | A1 | 1/2017 | Tongaonkar et al. |
| 2017/0032130 | A1 | 2/2017 | Joseph et al. |
| 2017/0041334 | A1 | 2/2017 | Kahn et al. |
| 2017/0060958 | A1 | 3/2017 | Van Rest et al. |
| 2017/0078322 | A1 | 3/2017 | Seiver et al. |
| 2017/0085595 | A1 | 3/2017 | Ng et al. |
| 2017/0163506 | A1 | 6/2017 | Keller |
| 2017/0230410 | A1 | 8/2017 | Hassanzadeh et al. |
| 2017/0318050 | A1 | 11/2017 | Hassanzadeh et al. |
| 2017/0324768 | A1 | 11/2017 | Crabtree et al. |
| 2017/0364702 | A1 | 12/2017 | Goldfarb et al. |
| 2017/0366416 | A1 | 12/2017 | Beecham et al. |
| 2018/0013771 | A1 | 1/2018 | Crabtree et al. |
| 2018/0103052 | A1 | 4/2018 | Choudhury et al. |
| 2018/0152468 | A1 | 5/2018 | Nor et al. |
| 2018/0159890 | A1 | 6/2018 | Warnick et al. |
| 2018/0159891 | A1 * | 6/2018 | Sultan ................ G06F 21/554 |
| 2018/0183827 | A1 | 6/2018 | Zorlular et al. |
| 2018/0255077 | A1 | 9/2018 | Paine |
| 2018/0255080 | A1 | 9/2018 | Paine |
| 2018/0295154 | A1 | 10/2018 | Crabtree et al. |
| 2018/0367548 | A1 | 12/2018 | Stokes, III et al. |
| 2019/0052663 | A1 | 2/2019 | Lee et al. |
| 2019/0052664 | A1 | 2/2019 | Kibler et al. |
| 2019/0132344 | A1 | 5/2019 | Lem et al. |
| 2019/0141058 | A1 | 5/2019 | Hassanzadeh et al. |
| 2019/0182119 | A1 | 6/2019 | Ratkovic et al. |
| 2019/0188389 | A1 | 6/2019 | Peled et al. |
| 2019/0230129 | A1 | 7/2019 | Digiambattista et al. |
| 2019/0312898 | A1 | 10/2019 | Verma et al. |
| 2019/0319987 | A1 | 10/2019 | Levy et al. |
| 2019/0362279 | A1 | 11/2019 | Douglas |
| 2019/0373005 | A1 | 12/2019 | Bassett |
| 2020/0014718 | A1 | 1/2020 | Joseph Durairaj et al. |
| 2020/0042328 | A1 | 2/2020 | Gupta |
| 2020/0042712 | A1 | 2/2020 | Foo et al. |
| 2020/0045069 | A1 | 2/2020 | Nanda et al. |
| 2020/0059481 | A1 * | 2/2020 | Sekar ................ H04L 63/1425 |
| 2020/0099704 | A1 | 3/2020 | Lee et al. |
| 2020/0112487 | A1 | 4/2020 | Inamdar et al. |
| 2020/0128047 | A1 | 4/2020 | Biswas et al. |
| 2020/0137104 | A1 | 4/2020 | Hassanzadeh et al. |
| 2020/0175175 | A1 | 6/2020 | Hadar et al. |
| 2020/0177615 | A1 | 6/2020 | Grabois et al. |
| 2020/0177616 | A1 | 6/2020 | Hadar et al. |
| 2020/0177617 | A1 | 6/2020 | Hadar et al. |
| 2020/0177618 | A1 | 6/2020 | Hassanzadeh et al. |
| 2020/0177619 | A1 | 6/2020 | Hadar et al. |
| 2020/0272972 | A1 | 8/2020 | Harry et al. |
| 2020/0296137 | A1 | 9/2020 | Crabtree et al. |
| 2020/0311630 | A1 | 10/2020 | Risoldi et al. |
| 2020/0351295 | A1 | 11/2020 | Nhlabatsi et al. |
| 2020/0358804 | A1 | 11/2020 | Crabtree et al. |
| 2021/0006582 | A1 | 1/2021 | Yamada et al. |
| 2021/0014265 | A1 | 1/2021 | Hadar et al. |
| 2021/0099490 | A1 | 4/2021 | Crabtree et al. |
| 2021/0105294 | A1 | 4/2021 | Kruse et al. |
| 2021/0168175 | A1 | 6/2021 | Crabtree et al. |
| 2021/0173711 | A1 | 6/2021 | Crabtree et al. |
| 2021/0218770 | A1 | 7/2021 | Ben-Yosef et al. |
| 2021/0248443 | A1 | 8/2021 | Shu et al. |
| 2021/0273978 | A1 | 9/2021 | Hadar et al. |
| 2021/0288992 | A1 * | 9/2021 | Attar ................... H04L 43/045 |
| 2021/0288995 | A1 | 9/2021 | Attar et al. |
| 2021/0336981 | A1 | 10/2021 | Akella et al. |
| 2021/0409426 | A1 | 12/2021 | Engelberg et al. |
| 2021/0409439 | A1 | 12/2021 | Engelberg et al. |
| 2022/0014445 | A1 | 1/2022 | Engelberg et al. |
| 2022/0014534 | A1 | 1/2022 | Basovskiy et al. |
| 2022/0021698 | A1 | 1/2022 | Hadar et al. |

(56) References Cited

U.S. PATENT DOCUMENTS

| | | |
|---|---|---|
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124115 A1 | 4/2022 | Grabois et al. |
| 2022/0129590 A1 | 4/2022 | Hadar et al. |
| 2022/0131894 A1 | 4/2022 | Hassanzadeh et al. |
| 2022/0150270 A1 | 5/2022 | Klein et al. |
| 2022/0182406 A1 | 6/2022 | Inokuchi |
| 2022/0188460 A1 | 6/2022 | Hadar et al. |
| 2022/0337617 A1 | 10/2022 | Basovskiy et al. |
| 2023/0021961 A1 | 1/2023 | Engelberg et al. |
| 2023/0034910 A1 | 2/2023 | Engelberg et al. |
| 2023/0067128 A1 | 3/2023 | Engelberg et al. |
| 2023/0067777 A1 | 3/2023 | Hadar et al. |
| 2023/0076372 A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

EP Extended Search Report in European Appln. No. 22157487.4, dated Jun. 9, 2022, 10 pages.

Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.

Hemberg et al., "Using a Collated Cybersecurity Dataset for Machine Learning and Artificial Intelligence," arXiv, Aug. 5, 2021, arXiv:2108.02618v1, 5 pages.

Horrocks et al., "SWRL: A Semantic Web Rule Language Combining OWL and RuleML," W3C Member Submission, May 21, 2004, 24 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Rossi et al., "Knowledge Graph Embedding for Link Prediction: A Comparative Analysis," arXiv, Feb. 3, 2020, arXiv:2002.00819v1, 42 pages.

Wikipedia.org [online], "Natural language processing," last updated Jun. 10, 2022, retrieved on Jun. 14, 2022, retrieved from URL<https://en.wikipedia.org/wiki/Natural language_processing>, 13 pages.

CyberSecurityWorks.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.

Grigorescu et al., "CVE2ATT&CK: BERT-Based Mapping of CVEs to MITRE ATT&CK Techniques," Algorithms, Aug. 31, 2022, 15(9):314, 22 pages.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al., "Cyber Security Analytics: A Stochastic Model for Security Quantification Using Absorbing Markov Chains," Journal of Communications, Dec. 2014, 9(12):899-907.

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Cohen-Addad et al., "Hierarchical Clustering: Objective Functions and Algorithms," Journal of the ACM, Jun. 2019, 66(4):26, 42 pages.

Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.

EP Extended Search Report in European Appln. No. 21191752.1, dated Jan. 4, 2022, 8 pages.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

(56) References Cited

OTHER PUBLICATIONS

EP Search Report in European Application No. EP19212976, dated Feb. 14, 2020, 8 pages.
EP Search Report in European Application. No. 21159421.3, dated Jun. 30, 2021, 11 pages.
EP Search Report in European Application. No. EP20185251, dated Oct. 21, 2020, 7 pages.
Fielder et al., "Decision support approaches for cyber security investment," Decision Support Systems, Jun. 2016, 86:13-23.
Foundations of Databases, 1st ed., Abiteboul et al. (eds.), 1995, Chapter 12, 38 pages.
Fundamentals of Business Process Management, 2nd ed., Dumas et al. (eds.), 2018, 546 pages.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
Grieves, "Virtually Intelligent Product Systems: Digital and Physical Twins", Complex Systems Engineering: Theory and Practice, Jul. 2019, 256:175-200.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hofner et al., "Dijkstra, Floyd and Warshall meet Kleene," Formal Aspects of Computing, Jul. 2012, 24(4-6):459-476.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE, "IEEE Standard for extensible Event Stream (XES) for Achieving Interoperability in Event Logs and Event Stream," IEEE Std 1849™-2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Murata, "Petri Nets: Properties, Analysis and Applications," Proceedings of the IEEE, Apr. 1989, 77(4):541-580.
Narmeen Zakaria Bawany; DDoS Attack Detection and Mitigation Using SON: Methods, Practices, and Solutions; SPRINGER-2017; p. 425-441.
National Institute of Standards and Technology [online], "National Vulnerability Database," last updated Jun. 2, 2020, retrieved on Jun. 3, 2020, retrieved from URL<https://nvd.nist.gov/>, 4 pages.
Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.
Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.
Networks: An Introduction, Newman (ed.), May 2010, 789 pages.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Phillips et al., "A graph-based system for network-vulnerability analysis," Proceedings of the 1998 Workshop on New Security Paradigms, Charlottesville, Virginia, Sep. 22-26, 1998, 71-79.
PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.
PM4Py.de [online], "Process Discovery," available on or before Jun. 26, 2020 via Internet Archive: Wayback Machine URL<https://web.archive.org/web/20200626094921/https://pm4py.fit.fraunhofer.

(56) References Cited

OTHER PUBLICATIONS de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Latheral Movement Cyber Attacks", Automated Descision Making for Active Cyber Defence, Oct. 2016, pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Shi et al., "Normalized Cuts and Image Segmentation," IEEE Transactions on Pattern Analysis and Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Sourceforge.net [online], "XSB," last updated Oct. 29, 2017, retrieved on Jun. 3, 2020, retrieved from URL<http://xsb.sourceforge.net/>, 2 pages.

Stanek et al., "Method of comparing graph differencing algorithms for software differencing," 2008 IEEE International Conference on Electro/Information Technology, Ames, Iowa, May 18-20, 2008, 482-487.

Strom et al., "MITRE ATT&CK™: Design and Philosophy", The MITRE Corporation, Jul. 2018, 37 pages.

Swiler et al., "A graph-based network-vulnerability analysis system," Sandia National Laboratories, 1997, Tech. Rep. SAND97-3010/1, 25 pages.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

The MITRE Corporation [online], "MITRE ATT&CK," last updated May 27, 2020, retrieved on Jun. 3, 2020, retrieved from URL <https://attack.mitre.org/>, 3 pages.

Ullah et al., "Towards Modeling Attacker's Opportunity for Improving Cyber Resilience in Energy Delivery Systems", Resilience Week, Aug. 2018, pp. 100-107.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Vehicle Power Management, 1st ed., Zhang et al.(eds.), Aug. 2011, Chapter 10, 27 pages.

Wang et al., "A Network Vulnerability Assessment Method Based on Attack Graph," 2018 IEEE 4th International Conference on Computer and Communications, Dec. 7-10, 2018, Chengdu, China, 1149-1154.

Wang et al., "Exploring Attack Graph for Cost-benefit Security Hardening: A Probabilistic Approach," Computers & Security, Feb. 2013, 32:158-169.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Active Directory," last updated Jun. 1, 2020, retrieved on Jun. 3, 2020, retrieved from URL<https://en.wikipedia.org/wiki/Active_Directory>, 14 pages.

Wikipedia.org [online], "Backward Chaining," last updated Nov. 16, 2019, retrieved on Jun. 3, 2020, retrieved from URL <https://en.wikipedia.org/wiki/Backward chaining>, 3 pages.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Cartesian Product," last updated Feb. 28, 2020, retrieved on Jun. 3, 2020, retrieved from URL <https://en.wikipedia.org/wiki/Cartesian_product>, 9 pages.

Wikipedia.org [online], "Centrality," last updated May 29, 2020, retrieved on Jun. 3, 2020, retrieved from URL<https://en.wikipedia.org/wiki/Centrality>, 15 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

Wikipedia.org [online], "Digital twin," last updated Jul. 8, 2021, retrieved on Jul. 9, 2021, retrieved from URL<https://en.wikipedia.org/wiki/Digital_twin>, 13 pages.

Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.

Wikipedia.org [online], "Flood Fill," last updated Dec. 24, 2019, retrieved on Jun. 3, 2020, retrieved from URL <https://en.wikipedia.org/wiki/Flood_fill>, 7 pages.

Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.

Wikipedia.org [online], "Forward Chaining," last updated Nov. 18, 2019, retrieved on Jun. 3, 2020, retrieved from URL <https://en.wikipedia.org/wiki/Forward_chaining>, 3 pages.

Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.

Wikipedia.org [online], "SCADA," last updated Jun. 2, 2020, retrieved on Jun. 3, 2020, retrieved from URL<https://en.wikipedia.org/wiki/SCADA>, 12 pages.

Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

(56) References Cited

OTHER PUBLICATIONS

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/INF000M.2016.7524584. (Year: 2016).

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

Yi et al., "Overview on attack graph generation and visualization technology," 2013 International Conference on Anti-Counterfeiting, Security and Identification (ASID), Shanghai, China, Oct. 25-27, 2013, 6 pages.

You et al., "A Review of Cyber Security Controls from An ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhang et al., "Optimal Decision-Making Approach for Cyber Security Defense Using Game Theory and Intelligent Learning," Security and Communication Networks, Dec. 23, 2019, 2019:3038586, 17 pages.

Zhao et al., "Attack graph analysis method for large scale network security hardening," J. Front. Comput. Sci. Technology, 2018, 12(2):263-273 (with English Abstract).

Abraham et al. "A Predictive Framework for Cyber Security Analytics Using Attack Graphs." International Journal of Computer Networks & Communications (IJCNC). vol. 7, No. 1, Jan. 2015. (Year: 2015).

Kaloroumakis et al., "Toward a Knowledge Graph of Cybersecurity Countermeasures," Technical Report, The MITRE Corporation, 2021, 11 pages.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Wikipedia.org [online], "Reachability," last updated Oct. 22, 2021, retrieved on Jul. 13, 2022, retrieved from URL<https://en.wikipedia.org/wiki/Reachability>, 5 pages.

EP Extended Search Report in European Appln. No. 22193272.6, dated Jan. 25, 2023, 8 pages.

Almeida et al., "An ontological analysis of the notion of community in the RM-ODP enterprise language," Computer Standards & Interfaces, Mar. 2013, 35(3):257-268.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Borgo et al., "Ontological Foundations of DOLCE," Theory and Applications of Ontology: Computer Applications, Aug. 5, 2010, 279-295.

Burger et al., "Scaling to the end of silicon with edge architectures," Computer, Jul. 2004, 37(7):44-55.

Cravero, "Big data architectures and the internet of things: A systematic mapping study," IEEE Latin America Transactions, Apr. 2018, 16(4):1219-1226.

Daniele et al., "An ontological approach to logistics," Enterprise Interoperability: Research and Applications in the Service-oriented Ecosystem, Oct. 11, 2013, 199-213.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

Gailly et al., "Ontological Reengineering of the REA-EO using UFO," Presented at Proceedings of the International Workshop on Ontology-Driven Software Engineering, Orlando, FL, USA, Oct. 2009, 15 pages.

Gandomi et al., "Beyond the hype: Big data concepts, methods, and analytics," International Journal of Information Management, Apr. 2015, 35(2):137-144.

Genovese, "Data mesh: the newest paradigm shift for a distributed architecture in the data world and its application," Thesis for the degree of Computer Engineering, Politecnico di Torino, 2021, 76 pages.

Giunchiglia et al., "Lightweight Ontologies," Technical Report DIT-07-071, University of Trento, Oct. 2007, 10 pages.

Gomez-Perez et al., "Ontology languages for the Semantic Web," IEEE Intelligent Systems, Feb. 2002, 17(1):54-60.

Guarino, "Formal Ontology in Information Systems," Presented at Proceedings of the 1 st International Conference, Trento, Italy, Jun. 6-8, 1998, 3-15.

Guizzardi et al., "An Ontology-Based Approach for Evaluating the Domain Appropriateness and Comprehensibility Appropriateness of Modeling Languages," MoDELS, 2005, 691-705.

Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the "I" of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hassani et al., "Artificial Intelligence (AI) or Intelligence Augmentation (IA): What Is the Future?," AI, Apr. 12, 2020, 1(2):143-155.

Herre, "General Formal Ontology (GFO): A Foundational Ontology for Conceptual Modelling," Theory and Applications of Ontology: Computer Applications, Aug. 12, 2010, 297-345.

Jacobsen et al., "FAIR Principles: Interpretations and Implementation Considerations," Data Intelligence, Jan. 1, 2020, 2(1-2):10-29.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Martins et al., "A framework for conceptual characterization of ontologies and its application in the cybersecurity domain," Software and Systems Modeling, Jul. 2, 2022, 21:1437-1464.

(56) References Cited

OTHER PUBLICATIONS

Martins et al., "Conceptual Characterization of Cybersecurity Ontologies," The Practice of Enterprise Modelling, Nov. 18, 2020, 323-338.

Mathis, "Data lakes," Datenbank-Spektrum, Oct. 6, 2017, 17(3):289-293.

Monino, "Data Value, Big Data Analytics, and Decision-Making," Journal of the Knowledge Economy, Aug. 20, 2016, 256-267.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Sitton-Candanedo et al., "A review of edge computing reference architectures and a new global edge proposal," Future Generation Computer Systems, Oct. 2019, 99:278-294.

Tan et al., "Future internet: The Internet of Things," Presented at Proceedings of the 2010 3rd International Conference on Advanced Computer Theory and Engineering (ICACTE), Chengdu, China, Aug. 20-22, 2010,.

Uschold et al., "Ontologies: Principles, methods and applications," The Knowledge Engineering Review, Jan. 1996, 11(2):93-136.

Van Heijst et al., "Using explicit ontologies in KBS development," International Journal of Human-Computer Studies, Feb. 1997, 46(2-3):183-292.

Wand et al., "On the deep structure of information systems," Information Systems Journal, Jul. 1995, 5(3):203-223.

Wang et al., "Big data analytics in cyber security: network traffic and attacks," Journal of Computer Information Systems, Jan. 2020, 61(3):1-8.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

Chen Zhong, Towards Agile Cyber Analysis: Leveraging Visualization as Functions in Collaborative Visual Analytics, IEEE:2017, pp. 1-2.

EP Extended Search Report in European Appln. No. 22187514.9, dated Nov. 29, 2022, 7 pages.

* cited by examiner

AUTOMATED PRIORITIZATION OF PROCESS-AWARE CYBER RISK MITIGATION

CROSS-REFERENCE TO RELATED APPLICATION

This application claims the benefit of U.S. Provisional Application No. 63/150,664, filed Feb. 18, 2021, the contents of which are incorporated by reference herein.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. Computer networks are used to execute processes that support operations of enterprises and/or industrial infrastructures. Enterprises, in general, and industrial infrastructures, in particular, are increasingly connected to external networks such as the Internet. As such, processes that were once isolated from the open Internet network, are now vulnerable to external cyber-attacks. As the frequency and derived impact of these attacks increase, there is a need to prioritize and mitigate risks in order of importance to the operations.

To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter. Despite the presence of a layered architecture, the spate of attacks is increasing rapidly and span from large enterprises to critical infrastructure (CINF) networks. Due to the potential severe damage and cost experienced by a victim, CINFs have been intentionally targeted and have suffered from significant losses when successfully exploited.

In an effort to defend against cyber-attacks, so-called analytical attack graphs (AAGs) can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped).

SUMMARY

Implementations of the present disclosure are directed to mitigating cyber security risk in enterprise networks. More particularly, implementations of the present disclosure are directed to using process-aware analytical attack graphs (AAGs) and a mitigation simulator to prioritize mitigation efforts to mitigate risk in enterprise networks. In some examples, a mitigation list is provided, a set of remedial actions can be identified based on the mitigation list, and remedial actions can be executed to mitigate risk to enterprise networks.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include receiving graph data representative of a process-aware AAG that is representative of potential lateral movement of adversaries within a computer network, receiving risk profile data representative of a risk profile of an enterprise with respect to two or more risk aspects, generating, by a process-aware risk assessment module, a risk assessment based on the process-aware AAG and the risk profile, and generating, by a mitigation simulator module, a mitigation list based on the process-aware AAG, the risk profile, and the risk assessment, the mitigation list comprising a prioritized list of two or more facts of the process-aware AAG. Other implementations of this aspect include corresponding systems, apparatus, and computer programs, configured to perform the actions of the methods, encoded on computer storage devices.

These and other implementations can each optionally include one or more of the following features: actions further include providing a set of remediation actions based on the mitigation list, and executing at least one remediation action in the set of remediation actions to mitigate risk to the computer network; nodes of the process-aware AAG are associated with process attributes, a process attribute maps a node to at least a portion of a process that is at least partially executed within the computer network; edges of the process-aware AAG represent relationships between processes; for an edge between a first node and a second node of the process-aware AAG, the edge is associated with an importance vector representing a risk dependency between a process mapped to the first node and a process mapped to the second node; the risk profile includes a set of risk acceptance scores, each risk acceptance score representing a tolerance of the enterprise to a respective risk aspect; a risk aspect includes one of a safety, availability, integrity, and confidentiality; and the mitigation list is generated based on one of minimizing a risk aspect of the two or more risk aspects and minimizing a total score that is determined based on all of the two or more risk aspects; generating the risk assessment comprising generating a set of risk scores for contexts of each of process, crown jewel, and attack goals; each set of risk score represents risk of one of the two or more risk aspects.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
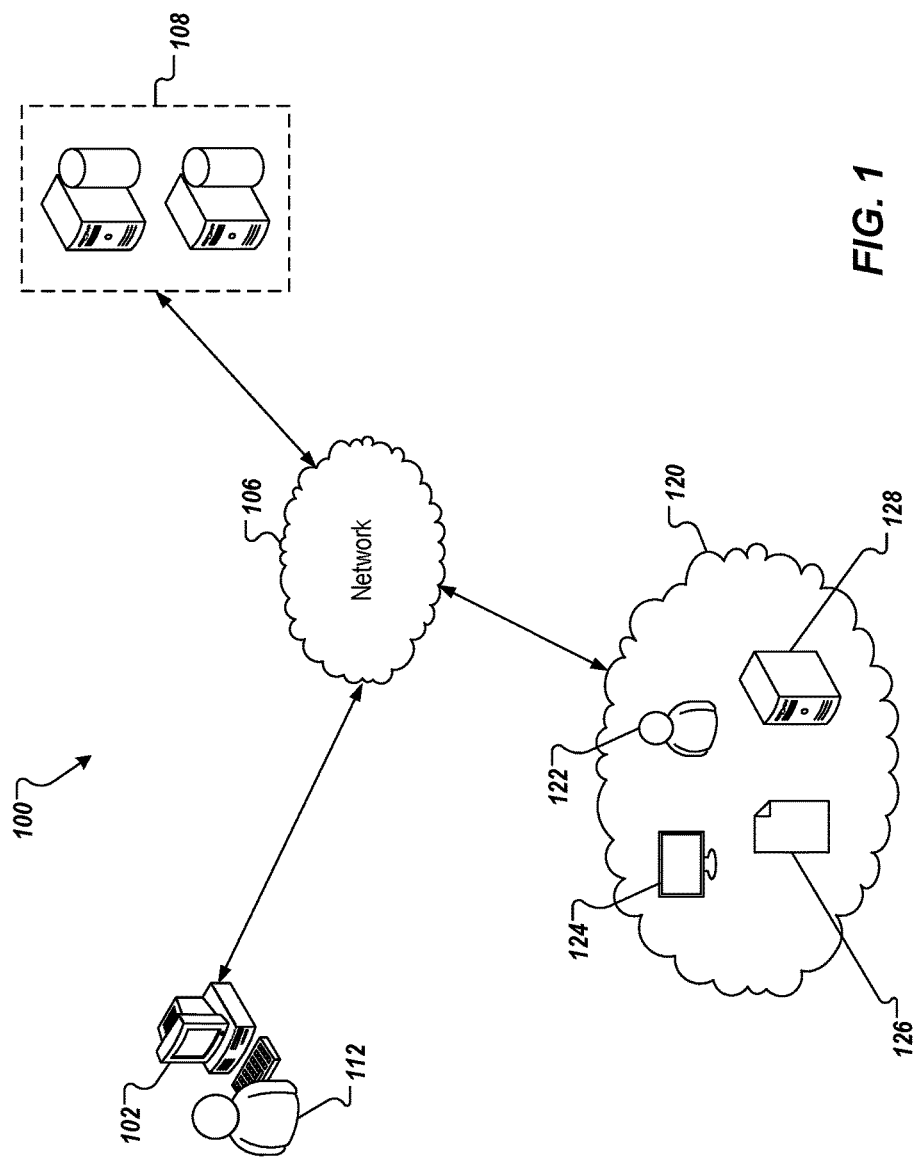
FIG. 1 depicts an example architecture that can be used to execute implementations of the present disclosure.

Implementations of the present disclosure are directed to mitigating cyber security risk in enterprise networks. More particularly, implementations of the present disclosure are directed to using process-aware analytical attack graphs (AAGs) and a mitigation simulator to prioritize mitigation efforts to mitigate risk in enterprise networks. In some examples, a mitigation list is provided, a set of remedial actions can be identified based on the mitigation list, and remedial actions can be executed to mitigate risk to enterprise networks.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include receiving graph data representative of a process-aware AAG that is representative of potential lateral movement of adversaries within a computer network, receiving risk profile data representative of a risk profile of an enterprise with respect to two or more risk aspects, generating, by a process-aware risk assessment module, a risk assessment based on the process-aware AAG and the risk profile, and generating, by a mitigation simulator module, a mitigation list based on the process-aware AAG, the risk profile, and the risk assessment, the mitigation list comprising a prioritized list of two or more facts of the process-aware AAG.

To provide context for implementations of the present disclosure, and as introduced above, computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. Computer networks are used to execute processes that support operations of enterprises and/or industrial infrastructures. Enterprises, in general, and industrial infrastructures, in particular, are increasingly connected to external networks such as the Internet. As such, processes that were once isolated from the open Internet network, are now vulnerable to external cyber-attacks. As the frequency and derived impact of these attacks increase, there is a need to prioritize and mitigate risks in order of importance to the operations.

Modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINF networks have been intentionally targeted intentionally and have suffered from significant losses when successfully exploited.

In general, attacks on CINF networks occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider the topological connection between stepping stones to measure the difficulty of reaching a target. As another example, some traditional techniques only assume some predefined attacker skill set to estimate the path complexity. In reality, an attacker's capabilities and knowledge of the enterprise network evolve along attack paths to the target.

In an effort to defend against cyber-attacks, AAGs can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped). While much research has been dedicated to the analysis of a single AAG, little focus has been given to the analysis and comparison of multiple AAGs. In comparing multiple AAGs, the difference between the AAGs is a target of interest, as differences can reveal vulnerabilities that were added, were removed or that persisted across all AAGs.

In view of the above context, implementations of the present disclosure are directed to recommending remedial actions for cyber security. More particularly, implementations of the present disclosure are directed to automated process-aware recommendation of remedial actions to mitigate cyber security. As described in further detail, prioritization of remedial actions can include determining a risk assessment based on a process-aware AAG, and generating a prioritized list of remedial actions based on the risk assessment and a risk tolerance profile, the prioritized list of remedial actions being generated by a mitigation simulator.

In some examples, automated prioritization of remedial actions of the present disclosure can be realized within an agile security platform that considers attack complexity within an interconnected cyber infrastructure with a variety of attack paths to comprehensively address real attack scenarios. It is contemplated, however, that implementations of the present disclosure of the present disclosure can be realized in any appropriate cyber security platform.

In general, the agile security platform provides a cyber-threat analysis framework based on characterizing adversarial behavior in a multi-stage cyber-attack process. As described in further detail herein, how a threat proceeds within a network is investigated using an AAG and all possible attack stages are identified. In some implementations, each stage can be associated with network attributes. Using a holistic view of threat exposure provided by AAGs, attack techniques and tactics are incorporated into stepping stones found in AAGs.

In further detail, the cyber-threat analysis framework adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

As described herein, the agile security platform enables continuous cyber and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational efficiency and availability, maximize existing cyber security resources, reduce additional cyber security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provide such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premises systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform executes automated prioritization of remedial actions of the present disclosure based on the network information.

In some examples, the agile security platform provides one or more dashboards, alerts, notifications and the like to cyber security personnel that enable the cyber security personnel to react to and remediate security relevant events. For example, the user 112 can include a cyber security expert that views and responds to dashboards, alerts, and/or notifications of the agile security platform using the client device 102.

In some examples, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
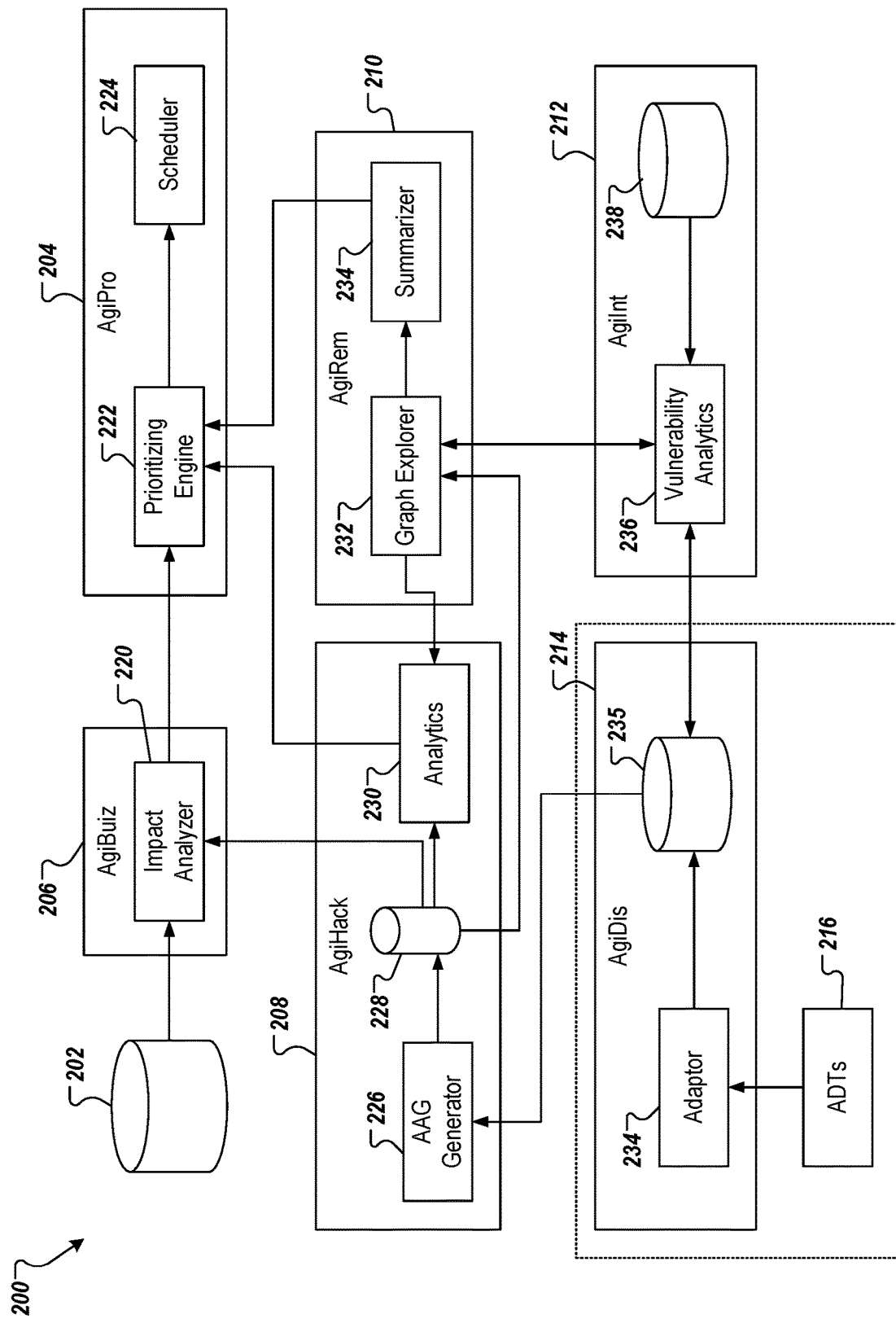
FIG. 2 depicts an example conceptual architecture of an agile security platform.

FIG. 2 depicts an example conceptual architecture 200 of an agile security (AgiSec) platform. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs using the resource-efficient AAG generation of the present disclosure, and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 236 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths. For example, the AgiRem service 210 can execute a cyber-threat analysis framework that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber-attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

As introduced above, cyber-threat analysis for a computer network leverages one or more AAGs. In some examples, an AAG is generated by a cyber security platform, such as the AgiSec platform described herein. In mathematical terms, an AAG can be described as a directed graph modeled as AAG (V, E) with a set of nodes $V=\{v_1, \ldots, v_n\}$ and a set of edges $E=\{e_1, \ldots, e_m\}$ connecting nodes together, where $|V|=n$ and $|E|=m$.

Figure 3:
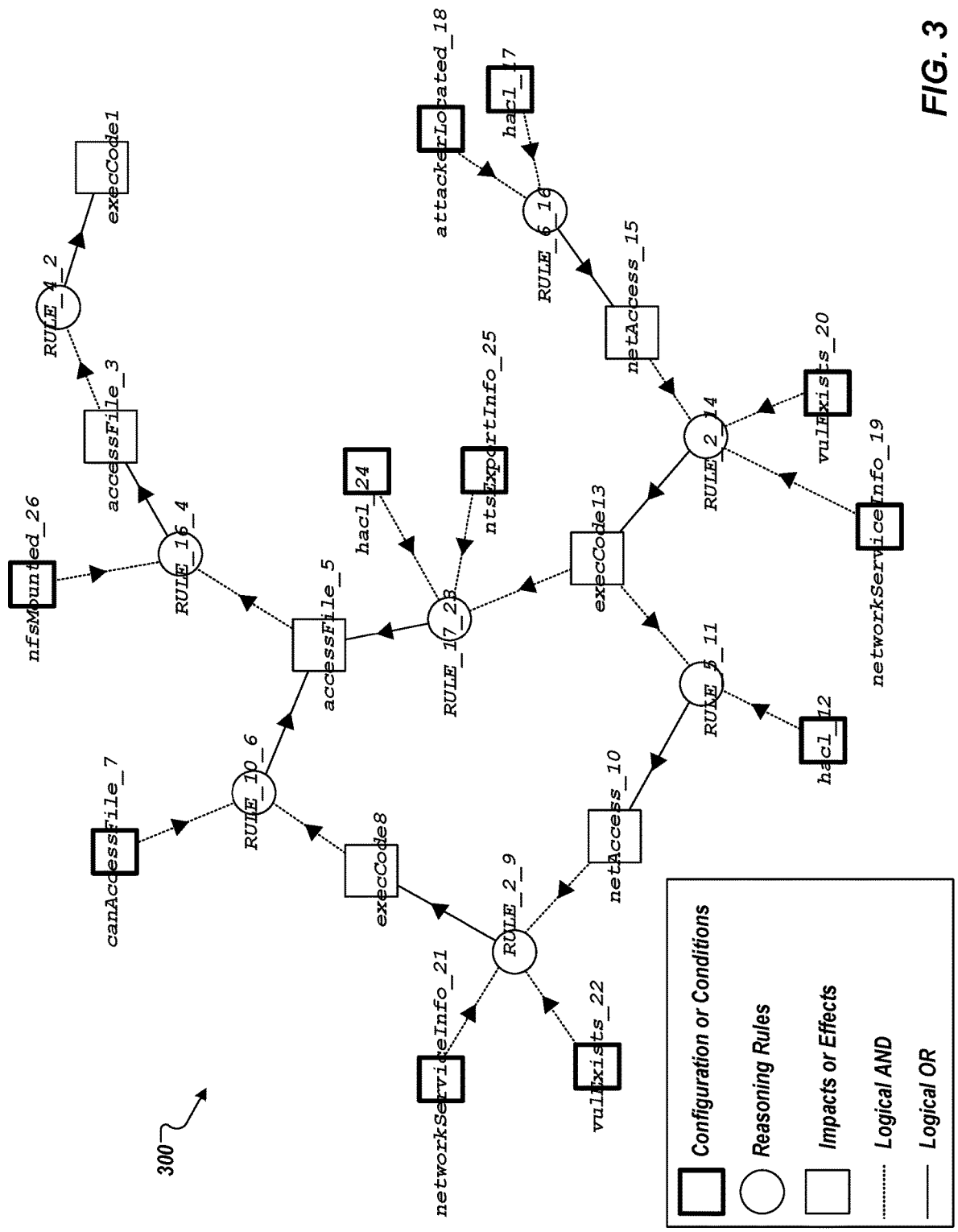
FIG. 3 depicts an example portion of an example analytical attack graph (AAG) to illustrate implementations of the present disclosure.

FIG. 3 depicts an example portion 300 of an example AAG to illustrate implementations of the present disclosure. As depicted in the example of FIG. 3, the AAG can include different node types to show how a set of network and system configurations result in unauthorized actions to specific targets. The example portion 300 is depicted in a database structure (e.g., Neo4j graph database structure). Nodes in an AAG are of different types: circular nodes representing system or network configurations that are the conditions that provide possibilities for actions by an attacker; circle-shaped nodes representing reasoning rules that represent the attack methodology leveraged by an attacker to achieve a particular goal; and square nodes that represent an impact as a sub-goal for a certain action an attacker could take. The AAG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, the AAG is created by taking into account the configurations directed by some rules in order to make some impacts on the target network. In some examples, all configuration nodes, impact nodes, and rule nodes can be provided in sets $N_p$, $N_d$, $N_r$, respectively. Accordingly, $N_p=\{n_{p,j}|n_{p,j}\in V, \forall n_{p,j}$ is a configuration$\}$, $N_d=\{n_{d,j}|n_{d,j}\in V, \forall n_{d,j}$ is an impact$\}$, and $N_r=\{n_{r,j}|n_{r,j}\in V, \forall n_{r,j}$ is a rule$\}$. Consequently, the combination of these sets accounts for all vertices of the graph. In some examples, a configuration node is referred to herein as an input fact node indicating facts that are provided as input within a configuration. In some examples, impact nodes are referred to herein as derived fact nodes indicating a derived fact that results from applying one or more input facts and/or one or more derived facts to a rule.

AAGs can be used in cyber-threat analysis to determine attack paths of external attackers into and through a computer network. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Further, generation of AAGs is described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

To provide further context for implementations of the present disclosure, the AAG model presented in MulVAL will be briefly discussed. MulVAL can be described as an automatic end-to-end AAG generation framework. In general, MulVAL takes a specification, such as, but not limited to, MITRE Common Vulnerabilities and Exposures (CVE), describing the configuration of an enterprise network and rules that depict how an attacker can exploit the system configurations to advance in the enterprise network towards a target goal. MulVAL uses datalog as a specification language. In datalog, logical and physical entities of the enterprise network are formally modelled by datalog predicates; n-ary relations between entities are defined by datalog relations; and attack rules are modelled as datalog derivation rules in a datalog program. Derivation rules define preconditions (set of predicates connected by logical 'and') that, if met, derive new predicates. The specification of the predicates and derivation rules can be referred to as the datalog program of the system (enterprise network).

For purposes of illustration, a non-limiting example is introduced in Listing 1, below, which shows a specification of an example datalog program for an enterprise network (system).

Listing 1: Example datalog program

```
predicates
.decl domainUser(_user: UserFqdn, _domain: Domain)
.decl groupContains(_group: GroupFqdn, _principal: Principal)
.decl isUser(_user: UserFqdn)
.decl localGroup(_host: Host, _groupName: GroupName, _groupFqdn:
GroupFqdn)
.decl userInLocalGroup(_host: Host, _groupName: GroupName, _user:
UserFqdn)
.decl isUser(_user: UserFqdn, rule_id: String)
.decl groupContainsDirect(_group: GroupFqdn, _principal: Principal)
attack rules
groupContains(Group,Principal):-groupContainsDirect(Group,Principal).
# rule label: 28
isUser(User):-domainUser(User,_). # rule label: 80
userInLocalGroup(Host,GroupName,User):-
localGroup(Host,GroupName,GroupFqdn),groupContains(GroupFqdn,User,_),
isUser(User,_). # rule label: 25
```

The example datalog program of Listing 1 lists seven predicates. Each predicate is a function that maps objects of different types to a Boolean value. For example, the predicate domainUser maps objects of type User and objects of type Domain to True if the user belongs to the domain, and False otherwise.

The example datalog program of Listing 1 lists three attack rules. The first attack rule indicates that a predicate groupcontains is derived from the predicate groupContainsDirect (with the corresponding objects). The third attack rule indicates that three precondition predicates: isUser, localGroup, groupcontains derive the predicate userInLocalGroup (with the corresponding objects). Each rule has a unique identifier (id). For example, 28 for the first attack rule and 25 for the third attack rule.

The system configuration (e.g., instance of hosts, users, privileges on host, etc.) is provided as an array of facts (also referred to as grounds), each fact associated with a predicate of the datalog program.

Table 1: Example Input Facts for domainUser Table 1, below, lists four input facts of the isDomain predicate.

TABLE 1

Example Input Facts for domainUser

| | |
|---|---|
| <ADMINISTRATOR>@CYBER.LOCAL | CYBER.LOCAL |
| BERTHA.DAVIES@CYBER.LOCAL | CYBER.LOCAL |
| BRANDON.DAVIS@CYBER.LOCAL | CYBER.LOCAL |
| DANIELLE.HINTON@CYBER.LOCAL | CYBER.LOCAL |

The listed user-domain pairs represent mappings that are True. Combinations (of user and domain) that are not listed in the input facts are considered False, until proven otherwise (i.e., derived by a rule).

MulVAL uses a datalog solver on the program specification to check whether there exists an attack path from the input facts to a target goal. It does this by iteratively applying the derivation rules on facts until either reaching a target goal (a path exists) or reaching a fixed point, from which no new fact can be derived. In this case, no attack path to the target exists and the system is considered to be secure.

The derivation process from the grounded facts to the target goals is represented in the resulting AAG. An AAG is provided as a data object that records nodes and edges between nodes, described herein. The data object underlying an AAG can be processed to generate a visual representation, a graph, of the AAG.

In further detail, MulVAL generates an AAG that shows the derivation of grounded facts by the application of rules. Formally, the AAG is defined as: AAG=$(N_r, N_p, N_d, E, L, Args, G)$, where $N_r$, $N_p$, $N_d$ are the sets of nodes (rules (r), input facts (p), and derived facts (d), respectively), E is a set of edges that connect from facts to derivation rules (precondition) and from derivation rules to derived facts, L is a mapping from a node (i.e., an input fact, a derived fact, a rule) to its label (i.e., the predicate or rule that it is associated with), Args is a mapping of facts to their arguments (i.e., objects they are associated with), and $G \in N_d$ describes the target goal (e.g., crown jewel that may be a target for hackers). N denotes the union of all node elements in the graph (i.e., $N = N_r \cup N_p \cup N_d$). In some examples, primitive nodes and derived nodes (i.e., fact nodes) are denoted by $N_f$, where $N_f = N_p \cup N_d$. Every fact node in the graph is labeled with a logical statement in the form of a predicate applied to its arguments. In some examples, Args and L are separately encoded. For example, a configuration c={"DomainUser", "BERTHA.DAVIES@CYBER.LOCAL", "CYBER.LOCAL"} can be encoded as $N_p$={node_1}; L(node_1)="DomainUser"; Args(node_1)= ["BERTHA.DAVIES@CYBER.LOCAL", "CYBER.LOCAL"].

Every element of the AAG is uniquely identifiable. Each fact (input fact, derived fact) node is uniquely defined by its arguments and predicate label (i.e., no two nodes may have the same label and arguments). As described in further detail herein, a unique identifier (index) for each fact node can be provided based on this information. Every rule node is uniquely defined by its label, preconditions and derived fact. As also described in further detail herein, a unique index for each rule node can be provided based on this information. The AAG size can be defined as the number of nodes and edges in the AAG.

In some implementations, each node and each edge is uniquely identified by a respective identifier that is generated by encoding. Each identifier enables the respective node or edge to be indexed within dictionaries and/or libraries in a time- and resource-efficient manner. In some examples, each fact node includes a respective identifier that is determined based on a concatenation of the predicate label and the arguments of the fact node. In some examples, each rule node includes a respective identifier that is determined based on a concatenation of the rule label, the unique identifier(s) of predicate node(s) (i.e., one or more fact nodes input to the rule node), and the unique identifier(s) of derivative node(s) (i.e., one or more derived fact nodes output by the rule node). In some examples, lexicographical ordering is used for the precondition nodes and/or derived nodes to provide the order used in the concatenation. In some examples, each edge includes a respective unique identifier that is determined based on a concatenation of the unique identifier of the source node and the unique identifier of the target node. In some implementations, a concatenation is itself the encoding used to uniquely identify a respective node. In some implementations, each concatenation is processed through a hash function (e.g., a deterministic hash function) to generate a hash value, the hash value being the encoding used to uniquely identify a respective node.

In accordance with implementations of the present disclosure, and as described in further detail herein, automated prioritization of remedial actions is provided. In some implementations, a risk assessment of an enterprise network (or a portion thereof) is determined based on a process-aware AAG that is representative of the enterprise network. A risk tolerance profiled is provided that represent a risk tolerance per risk aspect. A mitigation simulator processes the risk assessment and the risk tolerance profile to generate a prioritized list of remedial actions. In some examples, a remedial action (also referred to as a security control) is in action that can be executed to mitigate (e.g., reduce) risk within the enterprise network. For example, a remedial action can be executed to mitigate a fact (e.g., input fact, derived fact).

Figure 4:
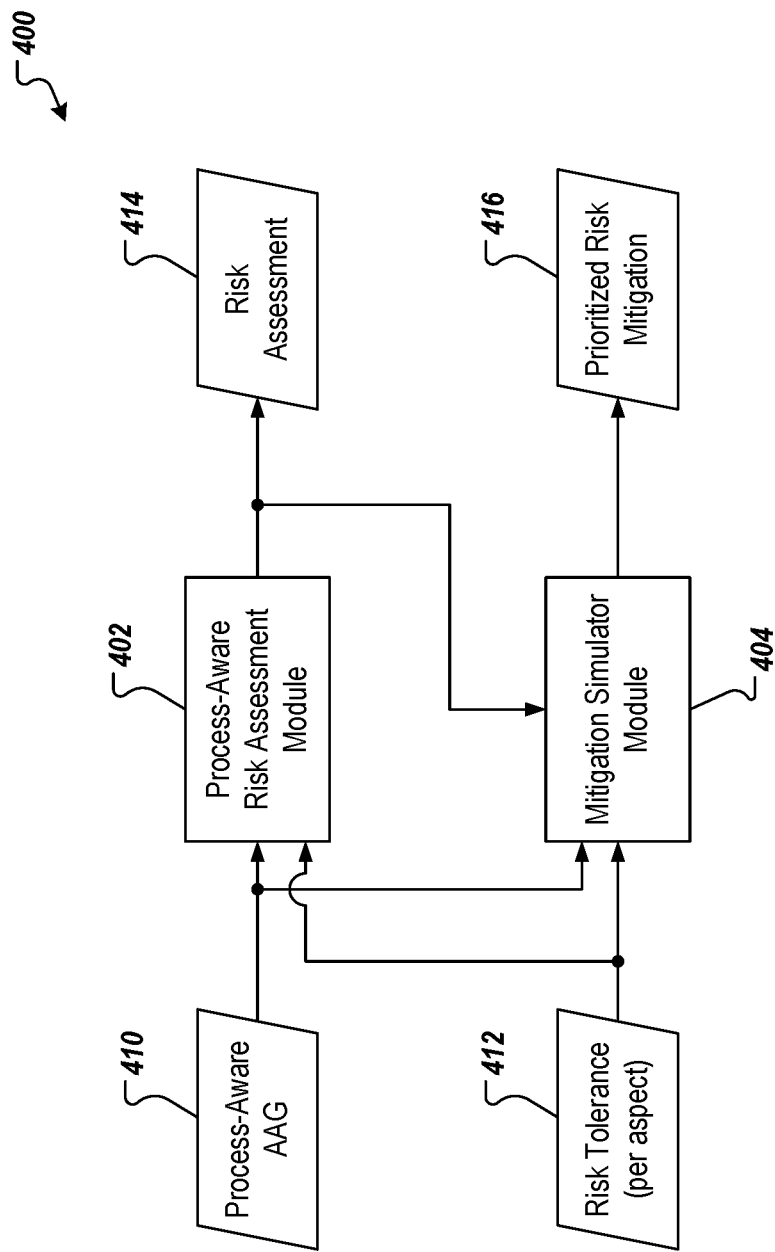
FIG. 4 depicts a conceptual architecture for prioritizing risk mitigation for cyber security in accordance with implementations of the present disclosure.

FIG. 4 depicts a conceptual architecture 400 for prioritizing risk mitigation for cyber security in accordance with implementations of the present disclosure. In the example of FIG. 4, the conceptual architecture 400 includes a process-aware risk assessment module 402 and a mitigation simulator 404. The process-aware risk assessment module 402 receives a process-aware AAG 410 and a risk tolerance profile 412, and generates a risk assessment 414. The mitigation simulator 404 receives the process-aware AAG 410, the risk assessment 414, and the risk tolerance profile 412, and generates a prioritized risk mitigation profile 416. In some examples, the prioritized risk mitigation profile 416 includes a prioritized list of remedial actions that can be executed within the enterprise network to mitigate cyber security risk therein.

In further detail, process-aware risk assessment module 402 performs a process-aware risk assessment based on the process-aware AAG 410 and the risk tolerance profile 412. In some examples, the process-aware AAG 410 is generated as described herein and/or as described in commonly assigned U.S. application Ser. Nos. 16/554,846 and 16/924,483, introduced above.

In some examples, a process-aware AAG, such as the process-aware AAG 410, includes fact nodes (i.e., configuration (condition) nodes of FIG. 3), impact nodes (i.e., impact (effect) nodes of FIG. 3), and rule nodes (i.e., reasoning rule nodes of FIG. 3). An entry point to the process-aware AAG, and thus the enterprise network represented by the process-aware AAG, is fact node (e.g., potential entry point of an attacker). In some examples, a so-called crown-jewel is an asset within the enterprise network (e.g., administrator credentials) that is targeted by attackers (e.g., a target asset). In some examples, an attack goal can refer to an impact node that is considered as a capability that an attacker could get over a crown-jewel.

In some examples, attributes of a process-aware AAG include, without limitation, hardness scores, impact vectors, asset identifier, and process context. In some examples, each rule (represented as a rule node) holds a hardness score (e.g., in range [0, 1]) that represents a measure on a required maturity level of an adversary to be able to execute the rule, resulting in an impact. In some examples, the hardness this score is set as an attribute of an outgoing edge of the rule node (e.g., incoming edge(s) have value of 0 set as hardness score). In some examples, each hardness score is specified by domain experts and embedded within an ontology per rule. In some examples, an attack goal holds an impact vector that includes a set of impact scores (e.g., each in range [0, 1]), each impact score corresponding to a respective risk aspect. Example risk aspects include, without limitation, safety, availability, integrity, and confidentiality. In some examples, an impact vector expresses the potential impact caused by execution of a rule. In some examples, impact vectors are specified by domain experts and are embedded within the ontology per impact type (e.g., denial of service (DoS) has a high impact on availability). In some examples, each asset (represented as a node that represents an asset), has an asset identifier, which enables mapping to the asset (e.g., rules are mapped to assets based on asset identifiers according to outgoing impacts).

In some examples, nodes of the AAG hold a process attribute based on a node-to-process mapping. In some examples, the node-to-process mapping maps a process to nodes (e.g., assets) that execute the process within the enterprise network. For example, the mapping can map different levels (e.g., process, sub-process, activity, task) of a process to one or more assets. Accordingly, assets of the enterprise network, as represented in the AAG, are mapped to processes the assets contribute to. In this manner, the AAG is considered to be a process-aware AAG.

Figure 5A:
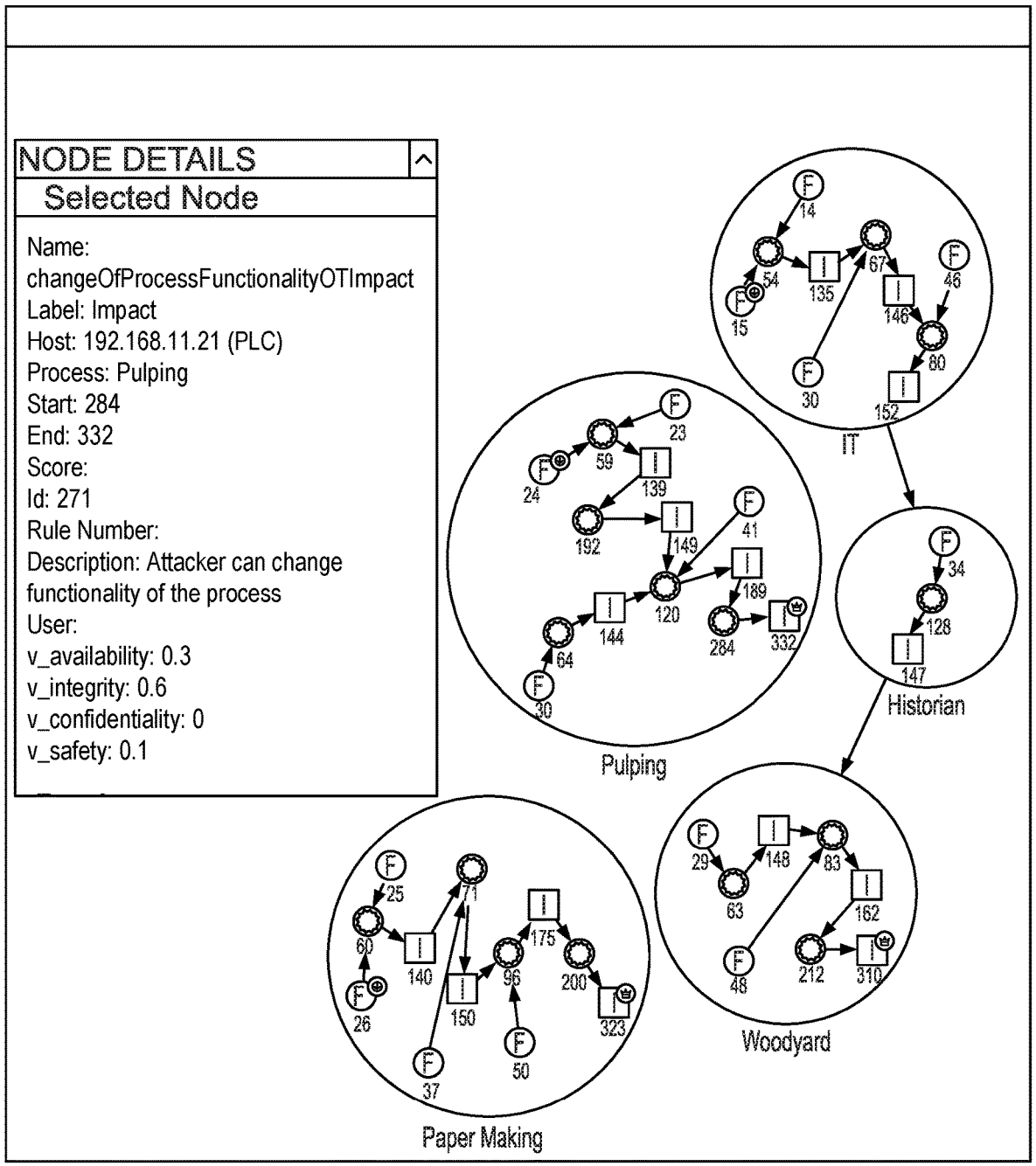
FIG. 5A depicts an example user interface (UI) depicting an example process-aware AAG.

FIG. 5A depicts an example user interface (UI) 500 depicting an example process-aware AAG. The process-aware AAG represents a pulp and paper process. The pulp and paper process includes multiple steps, which can be considered assets. The assets include woodyard (raw material preparation), pulping, and paper making. In the AAG, shown in the UI 500, "F" represents a fact about the network and "I" represents an impact.

Referring again to FIG. 4, the risk assessment 414 is provided as a risk vector representative of the context of process, crown-jewel, and attack goals. More particularly, the risk vector holds configurable risk aspects (e.g., availability, confidentiality, integrity, safety).

Figure 5B:
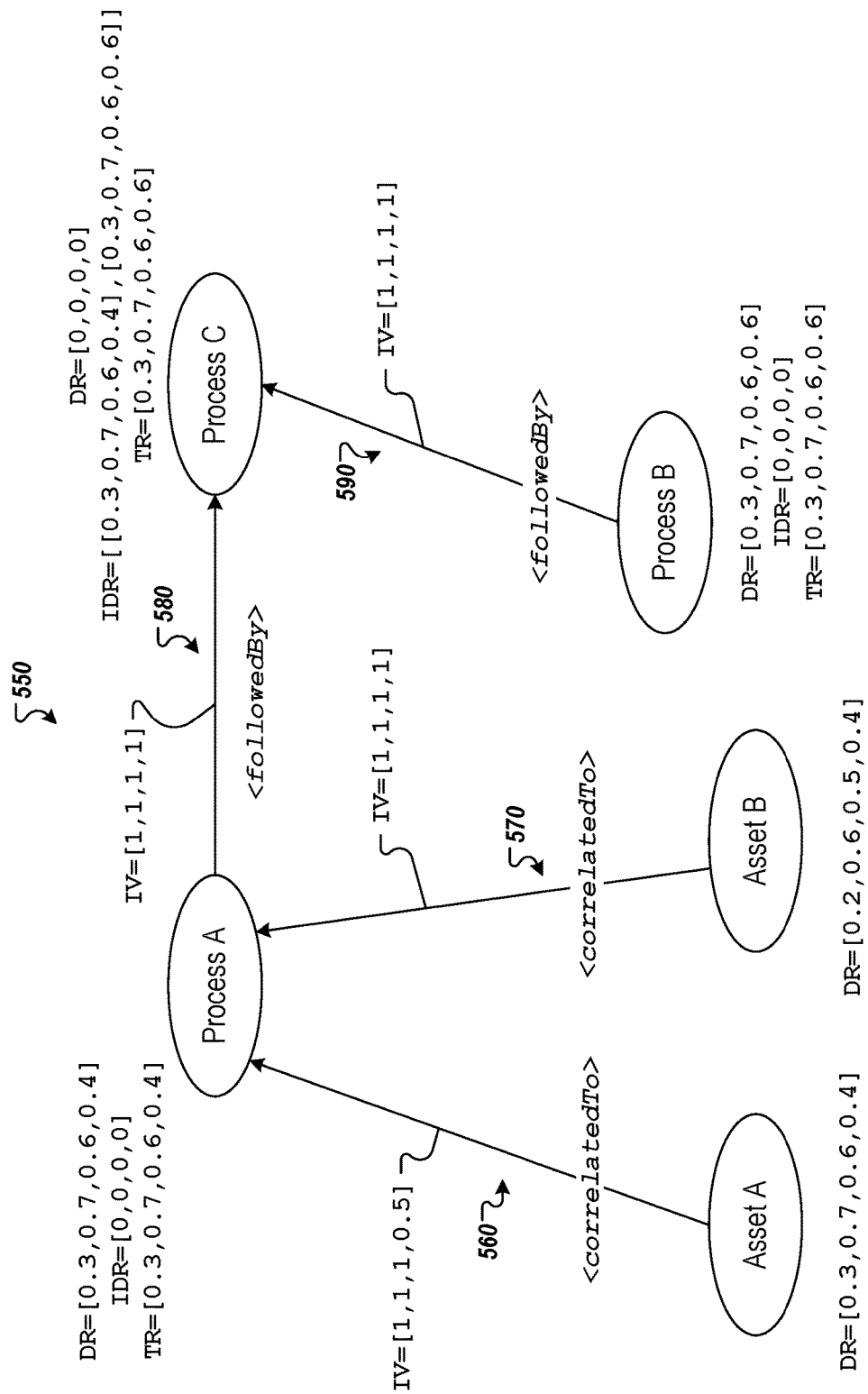
FIG. 5B depicts an example process-aware AAG including process dependencies.

FIG. 5B depicts an example process-aware AAG 550 representing processes and assets. Specifically, the process-aware AAG 550 includes nodes representing Asset A and Asset B, and nodes representing process elements A, B, and C. Thus, whereas the process-aware AAG illustrated in FIG. 5A can be used to determine risk at an asset level, the process-aware AAG 550 can permit risk assessment at a process level.

The process-aware AAG 550 also includes connections representing process dependencies between assets and processes, and dependencies between process elements. For example, the process-aware AAG 550 includes a connection 560 representing a correlation between Asset A and Process A, and a connection 570 representing a correlation between Asset B and Process A. The process-aware AAG 550 includes a connection 580 representing that Process C follows Process A, and a connection 590 representing that Process C follows Process B.

The process-aware AAG 550, includes process element nodes, can be used to account for risk propagation through various types of dependencies between process elements. For example, for each process element node, a direct risk (DR), indirect risk (IDR), and total risk (TR).

For each connection of the process-aware AAG 550, an importance vector (IV) can be assigned. The IV is a transformation vector of the risk from one element to another element. The IV indicates an amount of the risk that is to be carried from one node to a connected node.

For each node of the process-aware AAG 550, a set of incoming nodes (IN) can be determined. For example, for the process element node for Process C, The set of incoming nodes includes Process A and Process B.

Direct risk is a risk vector that is measured directly over an element and propagated to its connected nodes. The following example relationship is provided:

DR=max_aspect(IV*DR for IV,DR in IN)

where:
DR—Direct Risk
IV—Importance Vector
IN—Set of Incoming Nodes

Indirect risk, or followed risk, is an impact of a risk vector from an element to another that has process dependency relation. If the set of incoming nodes is zero, then indirect risk is zero and the importance vector is zero.

Total risk is the overall risk vector over an element considering both direct and indirect risk vectors for the element. The following example relationship is provided:

TR=max_aspect(DR,IDR)

The indirect risk for a following node is based on the total risk of incoming nodes. The following example relationship is provided:

IDR=[[IV*TR] for IV,TR in IN]

where:
IDR—Indirect Risk
IV—Importance Vector
TR—Total Risk
IN—Set of incoming nodes The process-aware AAG 550 can be traversed using an algorithm such as a depth-first search (DFS) algorithm. DFS is an algorithm for traversing or searching graph data structures. The algorithm starts at the root node (selecting some arbitrary node as the root node in the case of a graph) and explores as far as possible along each branch before backtracking. Input to the DFS algorithm includes the AAG with source node and related child node, and a function to be applied. Output of the DFS algorithm includes the AAG with propagated risk.

For consideration of risk propagation, assumptions can be made. In some examples, an assumption is that a node can be represented only within a single graph level. Other assumptions can include that leaf nodes do not hold incoming edges, that each leaf node has a pre-defined direct risk which is domain specific, and that risk propagation uses the same risk function across all graph levels.

Figure 6:
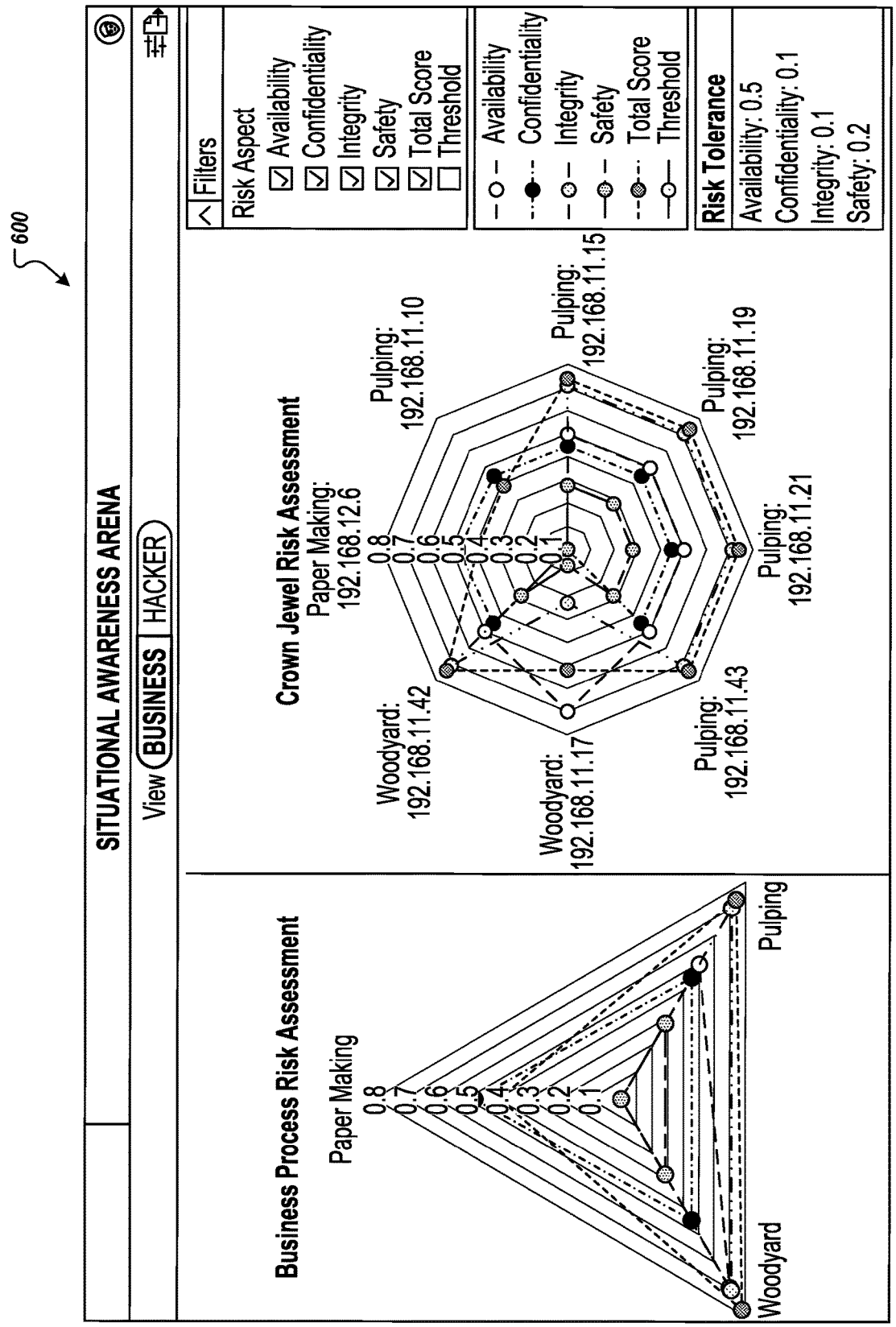
FIG. 6 depicts an example UI displaying an example process-aware risk assessment in accordance with implementations of the present disclosure.

FIG. 6 depicts an example UI 600 displaying an example process-aware risk assessment in accordance with implementations of the present disclosure.

Referring again to FIG. 4, in some implementations, a total score is calculated based on a user-defined risk tolerance. During mitigation simulation by the mitigation simulator module 404, a single risk aspect (e.g., safety) can be minimized or the total score can be minimized.

In further detail, the risk tolerance profile 412 defines a minimal risk level for each risk aspect in a set of configurable risk aspects (e.g., availability, confidentiality, integrity, safety). In some examples, the risk tolerance profile includes user-assigned acceptance scores to each risk aspect, an acceptance score represents an enterprise's minimal acceptance rate of a risk aspect. For example, if an enterprise accepts 50% safety risk, the acceptance score for the safety risk aspect is set to 0.5. The risk tolerance profile 412 is a risk vector holding the acceptance scores of all of the configurable risk aspects.

In some examples, a risk vector is calculated for each attack goal. For example, a risk vector per attack goal is calculated as a multifunction between the impact vector and the easiest way of reaching the attack goal. As long as it is easier to reach the attack goal, the risk vector converges to the impact vector, and as long as it is harder to reach the attack goal, the risk vector converges to 0. The following example relationship is provided:

$$\overrightarrow{AGR_i} = \overrightarrow{IV_i} \cdot e^{\frac{\sum_{r=1}^{R} H_r}{\alpha}}$$

where:
$\overrightarrow{AGR_i}$—risk vector over attack goal i
$\overrightarrow{IV_i}$—impact vector over attack goal i
R—set of rule nodes that compose the shortest path reaching the attack goal from all entry points
$H_r$—hardness of rule instance r
$\alpha$—normalizes the power number Direct risk can be calculated over the attack goals to and can be used to account for risk propagation through various types of dependencies between asset elements, similar to as described above with reference to FIG. 5B. For example, for each leaf node representing an attack goal, a direct risk (DR), indirect risk (IDR), and total risk (TR) can be determined. In this way, risk propagation between assets can be considered.

In some examples, a risk vector is calculated for each crown-jewel level. For example, a risk vector per crown-jewel is determined as the maximal risk over the attack goals that relate to the respective crown-jewel, where calculation is performed per risk aspect. The following example relationship is provided:

$$\overrightarrow{CJR_j} = \max_{i \in [n]}(AGR_{ia}) \text{ for } a \text{ in } A$$

where:
$\overrightarrow{CJR_j}$—risk vector over crown-jewel j
n—set of attack goals related to crown-jewel j
A—set of risk aspects a
$AGR_{ia}$ risk aspect a of attack goal i In some examples, a risk vector is calculated for process-level risk. For example, a risk vector per process is determined as the maximal risk over the crown-jewels that relate to the process, where calculation is performed per risk aspect. The following example relationship is provided:

$$\overrightarrow{BPR_p} = \max_{j \in [k]}(CGR_{ja}) \text{ for } a \text{ in } A$$

where:
$\overrightarrow{BPR_p}$—risk vector over process p
k—set of crown-jewels related to process p
A—set of risk aspects a
$CGR_{ja}$ risk aspect a of crown jewel j In some implementations, a total score is calculated as a sigmoid function of the sum of differences between risk aspects to their tolerance. In general, a sigmoid function is a mathematical function having a characteristic "S"-shaped curve (sigmoid curve). In some examples, when the sum of differences is equal to 0, the total score is equal to 0.5. As long as risk exceeds tolerance total, the total score converges to 1. As long as risk decreases from tolerance, the total score converges to 0. The following example relationship is provided:

$$BPT_p = S\left(\sum_{a}^{A}(BPR_{pa} - TOL_a)\right)$$

where:
$BPT_p$—total score of process p
S—sigmoid function defined as $$S(x) = \frac{e^x}{e^x + 1}$$

A—set of risk aspects a
$BPR_{pa}$—risk aspect a of process p
$\overrightarrow{TOL}$—risk tolerance vector
$TOL_a$ risk tolerance of aspect a In accordance with implementations of the present disclosure, the mitigation simulator (e.g., executed by the mitigation simulator module 402) takes a process-aware AAG and a risk tolerance as input, and automatically outputs mitigation priority in a manner that minimizes risk in the context of the process. As noted above, the mitigation priority can be based on minimizing a single risk aspect (e.g. safety) or the total score. In some examples, the mitigation priority is provided as a prioritized list of ordered facts (input facts, derived facts) that should be addressed (e.g., repaired). In some implementations, the mitigation simulator is provided as a greedy algorithm that, in each step, searches for the attack goal with the maximal process-level risk loss and mitigates the attack goal.

In mitigation simulation, the following example functions are defined:

| Function | Description | Input | Output |
|---|---|---|---|
| calculateRisk( ) | Calculates process-level risk assessment according to formulas above | Process name<br>Process-aware AAG<br>Risk score type (total score/single aspect score) | Process-level score (if total score, then $BPT_p$; if risk aspect, then $BPR_{pa}$)<br>Crown-jewel level score (if total score, then $\overrightarrow{CJR_j}$; if risk aspect, then $CJR_{ja}$)<br>Attack-goal level score (if total score, then $\overrightarrow{AGR_i}$; if risk aspect, then $AGR_{ia}$) |
| threshold( ) | Returns stop criteria for simulation | Risk Tolerance Vector<br>Risk score type (total score/single aspect score) | Threshold (if risk score type is 'total', then threshold is 0.5; if risk score type is a specific aspect, then threshold is $TOL_a$) |
| greedyRiskLoss( ) | Gets risk model results (initial process level risk) and search for the fact with the maximal process level risk loss (the different between the initial risk and the risk if fact would be removed) | Process-level score<br>Crown-jewel level score<br>Fact level score | Fact with maximal process level risk loss |
| mitigation_priority.append( ) | Create a list of prioritized facts to "remediate" | Fact node | List of fact nodes |
| Remove_fact( ) | Gets a process-aware attack graph, and a fact that should be eliminated from the graph. Returns a subgraph where the fact and all of its dependencies are removed. This is done by regenerating the graph without the fact | Process-aware attack graph<br>Fact node | Subgraph of the initial process-aware attack graph |

The following algorithm of Listing 1 represents a mitigation simulator in accordance with implementations of the present disclosure:

Listing 1: Mitigation Simulator

```
Input: Process aware attack graph, risk tolerance, risk score type, process name
process risk = calculateRisk(process name, process aware attack graph, risk score type)
t = threshold(risk tolerance, risk score, type)
while (process_risk > t) do:
|   fact_to_remove = greedyRiskLoss(process name, process aware attack graph)
|   mitigation_priority.append(fact_to_remove)
|   subgraph = remove_fact(fact_to_remove)
|   process_risk = calculateRisk(subgraph)
return mitigation_priority
```

In some implementations, the mitigation list output by the mitigation simulator is input to an automatic remediation system. In some examples, the automatic remediation system maps each fact of the mitigation list to a pre-defined automatic remediation action. For example, a remediation action can be associated with a fact, as a known remediation action for mitigating the fact (e.g., preventing the fact from occurring). The remediation actions are executed to mitigate risk within the enterprise network.

As described herein, implementations of the present disclosure enable enterprise to have clear visibility into security postures in the context of processes (at least partially) executed within enterprise networks. Further implementations of the present disclosure prioritizes mitigation efforts according to the impact over enterprise processes. Further, both the simulation and the risk assessment are based on a process-aware AAG. Implementations of the present disclosure are driven by information that is embedded within the twin ontology of risk vectors and rule hardness, and are instantiated to the instance level to the favor of risk calculation and mitigation prioritization. Considering risk-tolerance to automatically prioritize mitigations enables implementations of the present disclosure to be sensitive to user preferences.

Figure 7:
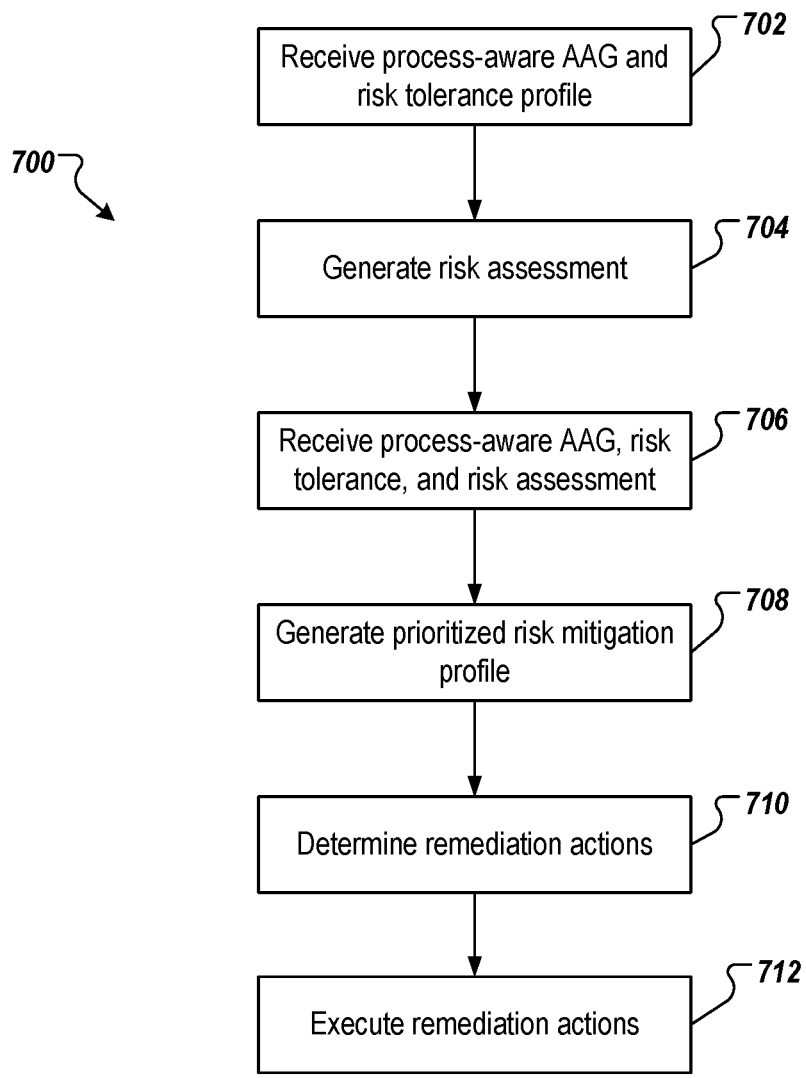
FIG. 7 depicts an example process that can be executed in accordance with implementations of the present disclosure.

FIG. 7 depicts an example process 700 that can be executed in accordance with implementations of the present disclosure. In some implementations, the example process 700 may be performed using one or more computer-executable programs executed using one or more computing devices.

A process-aware AAG and a risk tolerance profile are received (702). For example, a process-aware AAG representative of an enterprise network (or portion thereof) and a risk tolerance representative of risk tolerances of the enterprise across a set of risk aspects are received by each of a process-aware risk assessment module and a mitigation simulator module. A risk assessment is generated (704). For example, the process-aware risk assessment module generates a risk assessment based on the process-aware AAG and the risk tolerance profile. The risk assessment is received (706). For example, the mitigation simulator receives the risk assessment from the process-aware risk assessment module.

A mitigation list is generated (708). For example, the mitigation simulator executes a simulation (e.g., per Listing 1) based on the process-aware AAG, the risk tolerance profile, and the risk assessment and outputs a mitigation list. As described herein, the mitigation list includes a prioritized list of facts (input facts, derived facts) that can be mitigated to reduce risk. A set of remediation actions is determined (710). For example, one or more facts of the mitigation list can be mapped to at least one mitigation action. In some examples, a fact-to-mitigation action mapping can be retrieved from computer-readable memory, which identifies remediation actions that can be executed for respective facts. Remediation actions are executed (712). For example, a remediation action is executed to mitigate risk resulting from a respective fact.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for prioritizing mitigation in enterprise networks, the method being executed by one or more processors and comprising:
    receiving graph data representative of a process-aware analytical attack graph (AAG) that is representative of potential lateral movement of adversaries within a computer network;
    receiving risk profile data representative of a risk profile of an enterprise with respect to two or more risk aspects;
    generating, by a process-aware risk assessment module, a risk assessment based on the process-aware AAG and the risk profile;
    generating, by a mitigation simulator module, a mitigation list based on the process-aware AAG, the risk profile, and the risk assessment, wherein the mitigation list comprises a prioritized list of two or more facts of the process-aware AAG;
    prioritizing, by the mitigation simulator module, a set of remediation actions to mitigate the prioritized list of the two or more facts of the process-aware AAG; and
    executing at least one remediation action in the set of remediation actions based on the prioritization of the set of remediation actions.

2. The method of claim 1, wherein nodes of the process-aware AAG are associated with process attributes, a process attribute maps a node to at least a portion of a process that is at least partially executed within the computer network.

3. The method of claim 2, wherein edges of the process-aware AAG represent relationships between processes.

4. The method of claim 3, wherein, for an edge between a first node and a second node of the process-aware AAG, the edge is associated with an importance vector representing a risk dependency between a process mapped to the first node and a process mapped to the second node.

5. The method of claim 1, wherein the risk profile comprises a set of risk acceptance scores, each risk acceptance score representing a tolerance of the enterprise to a respective risk aspect.

6. The method of claim 1, wherein a risk aspect of the two or more risk aspects comprises one of a safety, availability, integrity, and confidentiality.

7. The method of claim 1, the mitigation list is generated based on one of minimizing a risk aspect of the two or more risk aspects and minimizing a total score that is determined based on all of the two or more risk aspects.

8. The method of claim 1, wherein generating the risk assessment comprising generating a set of risk scores for contexts of each of process, crown-jewel, and attack goals.

9. The method of claim 8, wherein each set of risk scores represents risk of one of the two or more risk aspects.

10. One or more non-transitory computer-readable storage media coupled to one or more processors and having instructions stored thereon which, when executed by the one or more processors, cause the one or more processors to perform operations for prioritizing mitigation in enterprise networks, the operations comprising:
    receiving graph data representative of a process-aware analytical attack graph (AAG) that is representative of potential lateral movement of adversaries within a computer network;
    receiving risk profile data representative of a risk profile of an enterprise with respect to two or more risk aspects;

generating, by a process-aware risk assessment module, a risk assessment based on the process-aware AAG and the risk profile;

generating, by a mitigation simulator module, a mitigation list based on the process-aware AAG, the risk profile, and the risk assessment, wherein the mitigation list comprises a prioritized list of two or more facts of the process-aware AAG;

prioritizing, by the mitigation simulator module, a set of remediation actions to mitigate the prioritized list of the two or more facts of the process-aware AAG; and executing at least one remediation action in the set of remediation actions based on the prioritization of the set of remediation actions.

11. The one or more non-transitory computer-readable storage media of claim 10, wherein nodes of the process-aware AAG are associated with process attributes, a process attribute maps a node to at least a portion of a process that is at least partially executed within the computer network.

12. The one or more non-transitory computer-readable storage media of claim 11, wherein edges of the process-aware AAG represent relationships between processes.

13. The one or more non-transitory computer-readable storage media of claim 12, wherein, for an edge between a first node and a second node of the process-aware AAG, the edge is associated with an importance vector representing a risk dependency between a process mapped to the first node and a process mapped to the second node.

14. The one or more non-transitory computer-readable storage media of claim 10, wherein the risk profile comprises a set of risk acceptance scores, each risk acceptance score representing a tolerance of the enterprise to a respective risk aspect.

15. The one or more non-transitory computer-readable storage media of claim 10, wherein a risk aspect of the two or more risk aspects comprises one of a safety, availability, integrity, and confidentiality.

16. The one or more non-transitory computer-readable storage media of claim 10, the mitigation list is generated based on one of minimizing a risk aspect of the two or more risk aspects and minimizing a total score that is determined based on all of the two or more risk aspects.

17. The one or more non-transitory computer-readable storage media of claim 10,
wherein generating the risk assessment comprising generating a set of risk scores for contexts of each of process, crown-jewel, and attack goals, and
wherein each set of risk scores represents risk of one of the two or more risk aspects.

18. A system, comprising:
one or more processors; and
a computer-readable storage device coupled to the one or more processors and having instructions stored thereon which, when executed by the one or more processors, cause the one or more processors to perform operations for prioritizing mitigation in enterprise networks, the operations comprising:
receiving graph data representative of a process-aware analytical attack graph (AAG) that is representative of potential lateral movement of adversaries within a computer network;
receiving risk profile data representative of a risk profile of an enterprise with respect to two or more risk aspects;
generating, by a process-aware risk assessment module, a risk assessment based on the process-aware AAG and the risk profile;
generating, by a mitigation simulator module, a mitigation list based on the process-aware AAG, the risk profile, and the risk assessment, wherein the mitigation list comprises a prioritized list of two or more facts of the process-aware AAG;
prioritizing, by the mitigation simulator module, a set of remediation actions to mitigate the prioritized list of the two or more facts of the process-aware AAG; and
executing at least one remediation action in the set of remediation actions based on the prioritization of the set of remediation actions.

\* \* \* \* \*